April 8, 1958 J. R. FITZGERALD 2,829,444
FRUIT AND VEGETABLE DRYER
Filed July 8, 1955 2 Sheets-Sheet 1

INVENTOR
J. R. FITZGERALD
BY
ATTORNEY

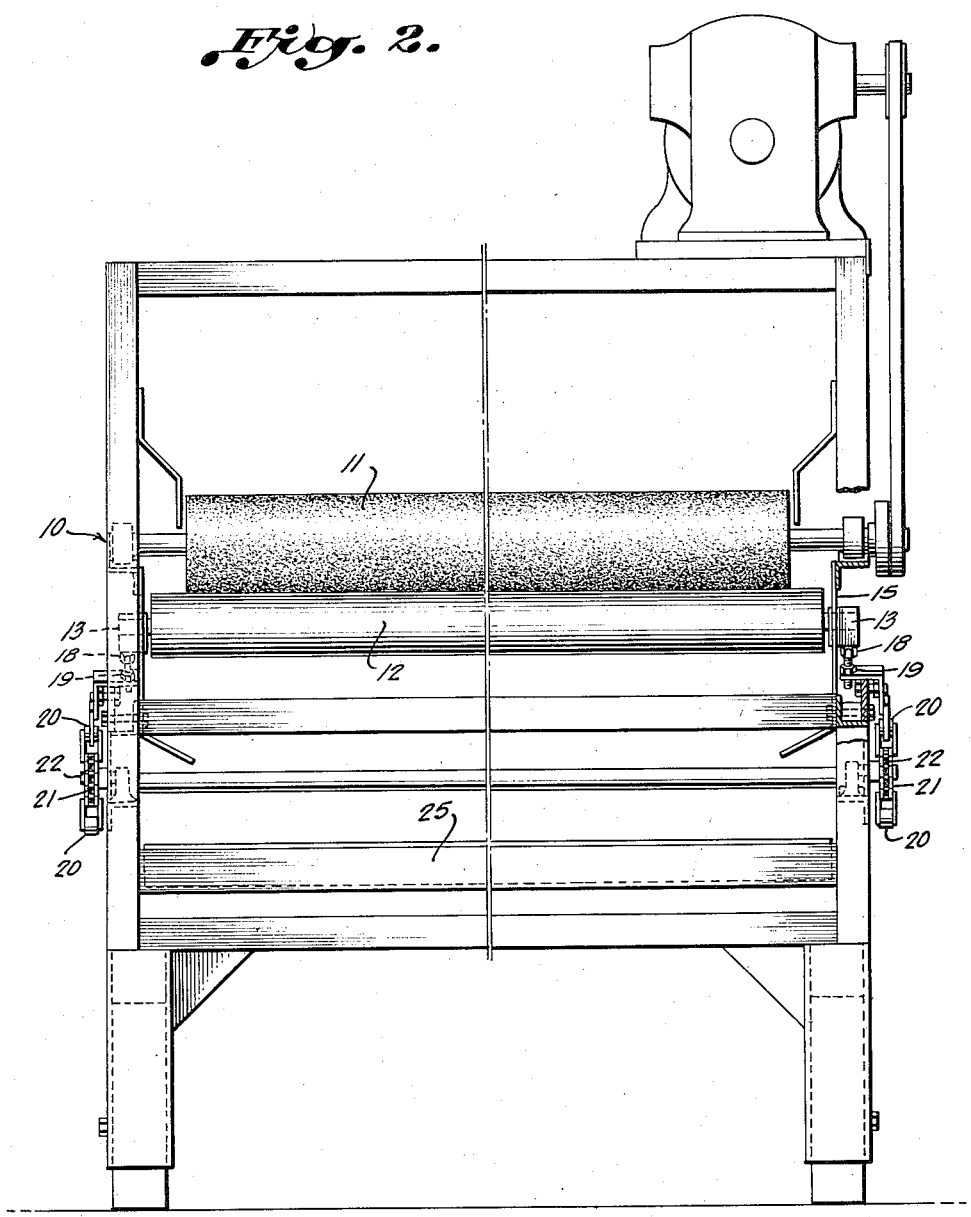

United States Patent Office 2,829,444
Patented Apr. 8, 1958

2,829,444
FRUIT AND VEGETABLE DRYER
John R. Fitzgerald, Harlingen, Tex.

Application July 8, 1955, Serial No. 520,729

6 Claims. (Cl. 34—95)

The present invention relates to an apparatus for removing water from the external surface of fruit and vegetables.

It is customary in the packing or further treatment of perishables such as fruits and vegetables to wash or spray them. After washing, the external water must be removed from the perishables and the perishables dried as rapidly as possible.

Many types of apparatus have been proposed to accomplish the above result and the present invention relates particularly to that type of water eliminator in which the fruit or vegetables travel in rolling contact with horizontal rollers, these generally being placed transversely of the direction of travel of the articles and having absorbent surfaces from which water is wrung out by wringer rollers placed thereagainst. It is common practice to use steel or wooden collers covered with an absorbent material such as intercellular sponge rubber, cellulose sponge or other synthetic sponges. In the conventional type of machine, the wringer or squeeze rollers are held in constant contact with the absorbent rolls by means of compression springs. One of the major objections to this type of machine is the fact that constant pressure of the squeeze rollers against the absorbent rolls tends to compress the absorbent material causing it to become matted thereby greatly reducing its capacity to absorb water quickly from the fruit or vegetables.

The seasons in which this machine usually operates are of short duration and it is customary for the machine to remain inoperative for several months. When the squeeze rolls are left pressed against the absorbent rolls for long periods, they will make a permanent impression in the absorbent material, and with some materials will adhere so that when the machine is started, large sections of the absorbent material are torn from the core of the absorbent rolls.

The above and other objections are overcome by the present invention wherein the squeeze rolls are mounted in such manner as to be normally out of contact with the absorbent rolls and are intermittently brought into contact with said rolls to squeeze the water from the rolls.

Thus, the primary object of the present invention is to provide a water eliminator of the absorbent roller type in which the absorbent surface material is maintained in a highly efficient condition.

It has been found that constant squeezing of the absorbent rollers of prior art devices is not as efficient as intermittent squeezing because when the sponge material is partially filled with water and then squeezed, there is a large run-off without much adherence to the squeeze rolls. With a small squeeze-out, the water hangs to the squeeze roller and a portion is redeposited onto the absorbent rolls. Because of the capillary attraction, a partially filled sponge absorbs the water more quickly. It has also been found that the load imposed on the machine is lessened with intermittent squeezing, since only one roll is being squeezed at a time, rather than the entire number of rollers comprising the dryer.

Other advantages and features of the present invention will be apparent from the following detailed description of a preferred embodiment of the invention taken in connection with the accompanying drawings wherein:

Figure 2 is an end elevational view thereof, partly in section.

Figure 1:
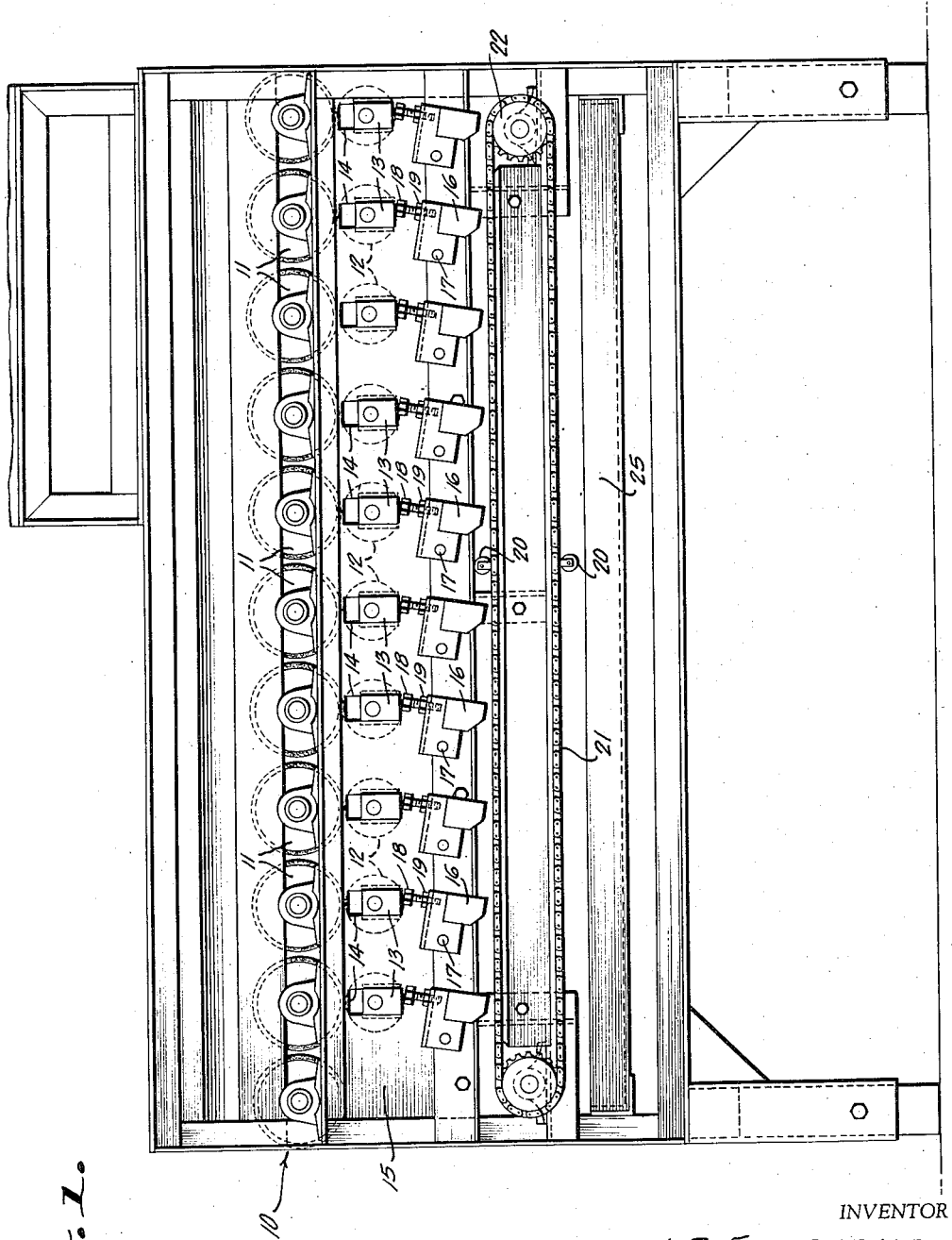
Figure 1 is a side elevational view of the dryer forming the subject matter of the present invention.

Referring to the drawings in detail, the dryer assembly is of conventional design indicated generally by the numeral 10 in which the absorbent rollers 11 are transversely mounted and rotated by a motor mounted on the dryer frame.

The novel water eliminator comprises a plurality of squeeze rollers 12 corresponding in number with the absorbent rollers, each of said squeeze rollers mounted on rectangular journals 13 directly below an absorbent roller, each of said journals slidably mounted for vertical movement in rectangular slots 14 formed in the vertical supports 15.

The means for raising the squeeze rollers into pressing contact with the absorbent rolls comprise a plurality of cam members 16, pivoted to the frame of the machine by offset pivots 17. An adjustment is provided for adjusting the pressure against the absorbent rolls and consists of an adjustment bolt 18 on each of the cam members, said bolts being locked in adjusted position by lock nuts 19. The cam members 16 are lifted by cam rollers 20 attached to the sprocket chain 21 mounted on the sprockets 22. The journal arrangement, cams and lifting means are mounted on both sides of the machine in order to lift both ends of the squeeze rolls at the same time.

A removable drain pan 25 is mounted below the rollers to catch the water squeezed from the absorbent rolls.

In operation, the fruit or vegetables are fed to the left end of the machine as viewed in Figure 1, with the absorbent rolls revolving clockwise about eighty revolutions per minute. The fruit or vegetables are advanced by the rotation of the rollers as well as being urged forward by other fruits and vegetables being fed into the machine. As the objects pass over the absorbent rollers, water is quickly absorbed by the rollers. As the rollers rotate, the sprocket chains on each side of the machine move slowly advancing the cam rollers 20 into contact with each of the cam members 16. Contact of the cam member by the roller, causes lifting of the cam member which in turn raises its corresponding squeeze roller and expresses the water from its corresponding absorbent roll. As the cam roller passes the cam member, the cam member drops to its retracted or lowered position permitting its corresponding squeeze roller to drop. Thus an intermittent raising and lowering of each squeeze roll results each time a cam roller 20 engages a cam member 16 with a corresponding intermittent squeezing of the absorbent rolls.

As moisture is expressed from the absorbent rollers, it falls into the drain pan 25 from which it may be discharged in any suitable manner.

From the foregoing description, it is readily apparent that the present construction is well adapted to accomplish the objects and advantages of the invention. It will be understood that minor changes may be made in the details of construction without departing from the spirit of the invention except as may be required by the scope of the following claims.

What I claim is:

1. In a water eliminator in which objects travel in rolling contact with horizontal rolls having fixed axis placed transversely to the direction of travel of the objects and having absorbent surfaces, means for removing water from said absorbent surfaces comprising a member positioned below each of said rolls and means for intermittently raising each of said members into pressing contact with said rolls.

2. In a water eliminator as claimed in claim 1, said member comprising a squeeze roll.

3. In a water eliminator in which objects travel in rolling contact with horizontal rolls having fixed axis placed transversely to the direction of travel of the objects and having absorbent surfaces, a squeeze roll positioned below each of the absorbent rolls, a cam member mounted below each of the squeeze rolls for lifting the same into pressing engagement with an absorbent roll and means for intermittently raising each of said cam members.

4. In a water eliminator as claimed in claim 3, said means comprising a revolving chain having at least one cam roller attached thereto.

5. In a water eliminator as claimed in claim 4, said cam members being pivotally mounted and having adjusting means mounted thereon.

6. A water eliminator for fruits or vegetables comprising a plurality of rollers having absorbent surfaces, means for removing water from said absorbent surfaces, said means comprising a member positioned below each of said rollers, and means for intermittently raising each of said members into pressing contact with said absorbent surfaces whereby to express water from said surfaces.

References Cited in the file of this patent
UNITED STATES PATENTS

| | | |
|---|---|---|
| 1,943,874 | Moe | Jan. 6, 1934 |
| 2,074,740 | Cutler et al. | Mar. 23, 1937 |
| 2,315,246 | Cunning | Mar. 20, 1943 |
| 2,317,144 | Grant | Apr. 20, 1943 |
| 2,534,205 | Newhall et al. | Dec. 12, 1950 |